United States Patent [19]

Coney et al.

[11] Patent Number: 5,041,489
[45] Date of Patent: * Aug. 20, 1991

[54] INK COMPOSITIONS AND PREPARATION

[75] Inventors: Charles H. Coney; John R. Gossett, Jr.; Theron E. Parsons, III, all of Kingsport, Tenn.

[73] Assignee: Eastman Kodak Company, Rochester, N.Y.

[*] Notice: The portion of the term of this patent subsequent to Apr. 10, 2007 has been disclaimed.

[21] Appl. No.: 463,724

[22] Filed: Jan. 12, 1990

Related U.S. Application Data

[63] Continuation of Ser. No. 278,918, Dec. 2, 1988, Pat. No. 4,916,177, which is a continuation of Ser. No. 50,434, May 18, 1987, abandoned, which is a continuation-in-part of Ser. No. 872,293, Jun. 2, 1986, abandoned.

[51] Int. Cl.$^5$ .................. C08L 67/02; C09C 11/10
[52] U.S. Cl. .................. 524/389; 524/602; 524/603
[58] Field of Search .................. 524/603, 389, 602

[56] References Cited

U.S. PATENT DOCUMENTS 4,772,941 9/1988 Nealy .................. 427/336
4,916,177 4/1990 Coney .................. 524/389

FOREIGN PATENT DOCUMENTS 50-121336 9/1975 Japan.
57-10663 1/1982 Japan.

Primary Examiner—Paul R. Michl
Assistant Examiner—Peter Szekely
Attorney, Agent, or Firm—Thomas R. Savitsky; William P. Heath, Jr.

[57] ABSTRACT

A composition useful in printing inks exemplified as comprising:

(A) from about 0.1 to about 60 weight % of one or more polyester materials having an acid component of from about 75 to about 84 mole % isophthalic acid and conversely from about 25 to about 16 mole % 5-sodio-sulfoisophthalic acid, and having a glycol component of from about 45 to about 60 mole % diethylene glycol and conversely from about 55 to about 40 mole % 1,4-cyclohexanedimethanol or ethylene glycol or mixtures thereof;

(B) from about 1.0 to about 60 weight % of pigment material blended with said polyester material; and (C) from about 10 to about 90 weight % of water admixed with alcohol selected from methanol, ethanol, n-propanol, isopropanol or mixtures thereof, preferably n-propanol by itself, in a weight ratio of water to alcohol of from about 99/1 to about 1/1.

10 Claims, No Drawings

INK COMPOSITIONS AND PREPARATION

This is a continuation of copending application Ser. No. 07/278,918 now U.S. Pat. No. 4,916,177 filed on Dec. 2, 1988, which is a continuation of application Ser. No. 07/050,434 now abandoned filed May 18, 1987, which is a continuation-in-part of application Ser. No. 06/872,293 now abandoned filed June 2, 1986.

This invention concerns pigmented, aqueous-alcohol inks having greatly improved printing properties such as flow-out, print smoothness and gloss, and the like, and also concerns concentrates for the preparation of these inks, and wherein the pigment carrier or binder comprises water dispersible polyester material. The term dispersible as used herein encompasses the phenomena of solubilization, dissipation, suspension and the like of the polyester in the aqueous system. No permanent property modifiers are necessary in the ink system for achieving markedly superior printed coatings by way of the present greatly simplified ink preparation and printing methods, however, such property modifiers as well as conventional dispersing aids, biocides, defoamers and the like may be used if desired. The present inks find special utility for letter press, intaglio, gravure, flexographic and other printing processes adaptable to the use of aqueous inks.

The printing industry in general finds many applications for the use of water-based inks and overprint varnishes as a means of meeting increasingly stringent solvent effluent regulations. Present-day water-based inks often fail to satisfy these regulations as well as the necessary printability, stability, and performance properties required for commercial inks. For example, the various ethylene-acrylic acid copolymer salts of U.S. Pat. No. 3,607,813, the disclosure of which is incorporated herein by reference (for the printing process descriptions therein), in addition to requiring complex polymer and ink preparations, lack in performance on certain substrates. Other such aqueous or semi-aqueous systems proposed for printing inks contain polymers such as styrene-butadiene or polyacrylate latex systems but these systems also have serious drawbacks including being nonwater-dispersible after short drying periods which complicates equipment clean up. Other water soluble or dispersible polymers suggested for printing ink use are discussed in U.S. Pat. No. 4,072,644.

The present invention provides vast improvements in the preparation, stability, and performance of water-based inks for printing and coating, particularly in regard to flow-out. The invention in its broad embodiment is defined as a composition useful as or for the manufacture of printing inks comprising:

(A) from about 5 to about 60 weight %, preferably from about 10 to about 40 weight %, and most preferably from about 15 to about 30 weight %, of polymeric material of at least one linear water-dispersible polymer having carbonyloxy linking groups in the linear molecular structure wherein up to 80% of the linking groups may be carbonylamido linking groups, the polymer having an inherent viscosity of from about 0.1 to about 1.0, preferably from about 0.1 to about 0.5 measured in a 60/40 parts by weight solution of phenol/tetrachloroethane at 25° C. and at a concentration of 0.25 gram of polymer in 100 ml of the solvent, the polymer containing substantially equimolar proportions of acid equivalents (100 mole percent) to hydroxy and amino equivalents (100 mole percent), the polymer comprising the reaction products of (a), (b), (c), and (d) from the following reactants or ester forming or ester-amide forming derivatives thereof;

(a) at least one difunctional dicarboxylic acid;
(b) from about 4 to about 25 mole percent, based on a total of all acid, hydroxyl and amino equivalents being equal to 200 mole percent, of at least one difunctional sulfomonomer containing at least one metal cationic group attached to an aromatic or cycloaliphatic nucleus wherein the functional groups are hydroxy, carboxyl or amino;
(c) at least one difunctional reactant selected from a glycol or a mixture of a glycol and diamine having two —NRH groups, the glycol containing two —CH$_2$—OH groups of which at least 15 mole
  (1) at least 15 mole percent, based on the total mole percent of hydroxy or hydroxy and amino equivalents, is a poly(ethylene glycol) having the structural formula

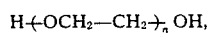

n being an integer of from 2 to about 20, or
  (2) of which from about 0.1 to less than about 15 mole percent, based on the total mole percent of hydroxy or hydroxy and amino equivalents, is a poly(ethylene glycol) having the structural formula

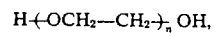

n being an integer of between 2 and about 500, and with the proviso that the mole percent of said poly(ethylene glycol) within said range is inversely proportional to the quantity of n within said range; and
(d) from none to at least one difunctional reactant selected from a hydroxycarboxylic acid having one —C(R)$_2$—OH group, an aminocarboxylic acid having one —NRH group, and an amino-alcohol having one —C(R)$_2$—OH group and one —NRH group, or mixtures of said difunctional reactants; wherein each R in the (c) or (d) reactants is a H atom or an alkyl group of 1 to 4 carbon atoms;

(B) from about 0.1 to about 60 weight %, preferably from about 5 to about 40 weight %, and most preferably from about 10 to about 30 weight %, of pigment material dispersed in said polymeric material; and (C) from about 10 to about 90 weight %, preferably from about 20 to about 80 weight %, and most preferably from about 30 to about 70 weight % of water admixed with alcohol selected from methanol, ethanol, n-propanol, isopropanol, or mixtures thereof, preferably n-propanol by itself, in a weight ratio of water to alcohol of from about 99/1 to about 1/1, preferably from about 85/10 to about 95/10, and most preferably about 90/10.

In the above polyester material it is preferred that very minor, e.g., less than about 10 mol % based on all reactants, of reactant (d) is employed, that at least about 70 mol % of reactant (c) is glycol, and that at least about 70 mol % of all the hydroxy equivalents is present in the glycol.

In preferred embodiments of the invention:
the polymeric material comprises (a) an acid component (moiety) of from about 75 to about 84 mole % isophthalic acid and conversely from about 25 to about 16 mole % 5-sodiosulfoisophthalic acid, and (b) a glycol component (moiety) of from about 45 to about 60 mole % diethylene glycol and conversely from about 55 to about 40 mole % 1,4-cyclohexanedimethanol or ethylene glycol;

the pigment material is dispersed in said polymeric material in a weight ratio of pigment material to total polymeric material, of from about 1/8 to about 4/1, and most preferably from about 1/3 to about 2/1;

the inherent viscosity of the polymeric material is from about 0.28 to about 0.35, the said acid component (moiety) comprises from about 80 to about 83 mole % isophthalic acid and conversely from about 20 to about 17 mole % 5-sodiosulfoisophthalic acid, and the said glycol component (moiety) comprises from about 52 to about 56 mole % diethylene glycol and conversely from about 48 to about 44 mole % 1,4-cyclohexanedimethanol;

the pigment is one or a mixture of the following color index materials according to their generic names: C.I. Pigment Yellow 17; C.I. Pigment Blue 27; C.I. Pigment Red 49:2; C.I. Pigment Red 81:1; C.I. Pigment Red 81:3; C.I. Pigment Red 81:x; C.I. Pigment Yellow 83; C.I. Pigment Red 57:1; C.I. Pigment Red 49:1; C.I. Pigment Violet 23; C.I. Pigment Green 7; C.I. Pigment Blue 61; C.I. Pigment Red 48:1; C.I. Pigment Red 52:1; C.I. Pigment Violet 1; C.I. Pigment White 6; C.I. Pigment Blue 15; C.I. Pigment Yellow 12; C.I. Pigment Blue 56; C.I. Pigment Orange 5; C.I. Pigment Black 7; C.I. Pigment Yellow 14; C.I. Pigment Red 48:2; and C.I. Pigment Blue 15:3;

the alcohol is n-propanol;

the aqueous-alcohol ink is coated or printed onto a substrate selected from metal foil, newsprint, bleached and unbleached Kraft paper, clay coated paper, glass, calendered paper, stainless paper, paper board, and films or other substrates of polyester, polycarbonate, cellulose ester, regenerated cellulose, poly(vinylidene chloride), polyamide, polyolefin, or polystyrene; and said coating or print comprises any of the above ink compositions wherein a substantial portion of the initial metal cations of the water solubilizing sulfonate groups of the polymeric material has been replaced with an insolubilizing polyvalent metal cation, such as $Al^{+3}$, $Ca^{++}$, or the like as disclosed and in the manner described in U.S. Pat. No. 4,145,469, the disclosure of which is incorporated herein by reference. As stated therein, generally, based on the weight of the polymeric material, 0.05% to about 2.0% by weight of the polyvalent metal cation are required for effective insolubilization.

The term "moiety" as used herein designates the residual portion of the reactant acid or glycol which actually enters into or onto the polymer chain during the condensation or polycondensation reaction.

The complete chemical definitions of the above C.I. pigments are given in the following table:

| Generic Name | Pigments C.A. Index/Chemical Name |
| --- | --- |
| C.I. Pigment Yellow 17 | Butanamide, 2,2'-[(3,3'-dichloro[1,1'-biphenyl]4,4'-diyl)bis(azo)bis[N(2-methoxyphenyl)-3-oxo- |
| C.I. Pigment Blue 27 | Ferrate (4-1), hexakis (cyano-C)-ammonium iron (3+)(1:1:1) |
| C.I. Pigment Red 49:2 | 1-Naphthalenesulfonic acid, 2-[(2-hydroxy-1-naphthalenyl)azo]-, calcium salt (2:1) |
| C.I. Pigment Red 81:1 | Benzoic acid, 2,-[6-ethylamino)-3-(ethylimino)-2,7-dimethyl-3H-xanthen-9-yl]-, ethyl ester, w/molybdenum tungsten hydroxide oxide phosphate |
| C.I. Pigment Red 81:3 | Benzoic acid, 2-[6-ethylamino)-3-ethylimino)-2,7-dimethyl-3H-xanthen-9-yl]-, ethyl ester, molybdate-silicate |
| C.I. Pigment Red 81:x | Benzoic acid, 2-[6-(ethylamino)-3-(ethylimino)-2,7-dimethyl-3H-xanthen-9-yl]-, ethyl ester, molybdate-phosphate |
| C.I. Pigment Yellow 83 | Butanamide, 2,2'-[(3,3'-dichloro[1,1'-biphenyl]-4,4'-diyl)bis(azo)bis[N-(4-chloro-2,5-dimethoxyphenyl)-3-oxo- |
| C.I. Pigment Red 57:1 | 2-Naphthalenecarboxylic acid, 3-hydroxy-4-[(4-methyl-2-sulfophenyl)azo]-, calcium salt (1:1) |
| C.I. Pigment Red 49:1 | 1-Naphthalenesulfonic acid, 2-[(2-hydroxy-1-naphthalenyl)azo]-, barium salt (2:1) |
| C.I. Pigment Violet 23 | Diindolo[3,3',2'm] triphenodioxazine, 8,18-dichloro-5,15-diethyl-5,15-dihydro- |
| C.I. Pigment Green 7 | C.I. Pigment Green 7 |
| C.I. Pigment Blue 61 | Benzenesulfonic acid, [[4-[[4-phenylamino)phenyl]-[4-(phenylimino)-2,5-cyclohexadien-1-ylidene]methyl]-phenyl]amino]- |
| C.I. Pigment Red 48:1 | 2-Naphthalenecarboxylic acid, 4-[(5-chloro-4-methyl-2-sulfophenyl)azo]-3-hydroxy-, barium salt (1:1) |
| C.I. Pigment Red 52:1 | 2-Naphthalenecarboxylic acid, 4-[(4-chloro-5-methyl-2-sulfophenyl)azo]-3-hydroxy-, calcium salt (1:1) |
| C.I. Pigment Violet 1 | Ethanaminium, N-[9-(2-carboxyphenyl)-6-(diethylamino)-3H-xanthen-3-ylidene]-N-ethyl-, molybdatetungstatephosphate |
| C.I. Pigment White 6 | Titanium oxide ($TiO_2$) |
| C.I. Pigment Blue 15 | Copper, [29H, 31H-phthalocyaninato (2-)-$N^{29}$, $N^{30}$, $N^{31}$, $N^{32}$], (Sp-4-1)- |
| C.I. Pigment Yellow 12 | Butanamide, 2,2'-[(3,3'-dichloro[1,1'-biphenyl]-4,4'-diyl)bis(azo)]bis[3-oxo-N-phenyl- |
| C.I. Pigment Blue 56 | Benzenesulfonic acid, 2-methyl-4-[[4-[[4-[(3-methylphenyl)amino]phenyl]-[4-[(3-methylphenyl)-imino]-2,5-cyclohexadien-1-ylidene]methyl]-phenyl]amino]- |
| C.I. Pigment Orange 5 | 2-Naphthalenol, 1-[(2,4-dinitrophenyl)azo]- |
| C.I. Pigment Black 7 | Carbon black |
| C.I. Pigment Yellow 14 | Butanamide, 2,2'-[(3,3'-dichloro[1,1'-biphenyl]4,4'-diyl)bis(azo)]bis-[N-(2-methylphenyl)-3-oxo- |

| | Pigments |
|---|---|
| Generic Name | C.A. Index/Chemical Name |
| C.I. Pigment Red 48:2 | 2-Naphthalenecarboxylic acid, 4-[(5-chloro-4-methyl-2-sulfophenyl)-azo]-3-hydroxy-, calcium salt (1:1) |
| C.I. Pigment Blue 15:3 | Copper, [29H, 31H-phthalocyaninato (2-)-$N^{29}$, $N^{30}$, $N^{31}$, $N^{32}$]-, (SP-4-1)- |

The inherent viscosities (I.V.) of the particular polyester materials useful herein range from about 0.1 to about 1.0 determined according to ASTM D2857-70 procedure, in a Wagner Viscometer of Lab Glass, Inc. of Vineland, N.J., having a ½ ml. capillary bulb, using a polymer concentration about 0.25% by weight in 60/40 by weight of phenol/tetrachloroethane. The procedure is carried out by heating the polymer/solvent system at 120° C. for 15 minutes, cooling the solution to 25° C. and measuring the time of flow at 25° C. The I.V. is calculated from the equation $$(n) \; 25° C. \atop 0.50\% = \frac{\ln \frac{t_s}{t_o}}{C}$$

where:
 (n)=inherent viscosity at 25° C. at a polymer concentration of 0.25 g/100 ml. of solvent;
 ln=natural logarithm;
 $t_s$=sample flow time;
 $t_o$=solvent-blank flow time; and
 C=concentration of polymer in grams per 100 ml. of solvent=0.25.

The units of the inherent viscosity throughout this application are in deciliters/gram. It is noted that higher concentrations of polymer, e.g., 0.50 g of polymer/100 ml solvent may be employed for more precise I.V. determinations.

In general, the present polyester materials are excellent film formers for water-based printing inks. The polymers form stable dispersions in water and produce tough, flexible films on drying. No permanent modifiers are required, and films will form at temperatures just above the freezing point of water. The polymers in dispersion form may be plasticized if necessary, for example, with certain water immiscible phthalate esters to high degrees of flexibility. Printing inks prepared from the aqueous-alcohol dispersed polymers are water reducible and require no wetting agents although such may be employed. The inks dry rapidly upon printing, wet surfaces exceptionally well and have excellent adhesion to many plastic films and metal foil as well as to paper, glass and many other substrates. Both the 100% solid polymers and the corresponding aqueous-alcohol dispersions thereof may be pigmented by conventional techniques, and the alcohol may be added prior to or during blending of the polymer aqueous dispersion and pigment or to the pre-formed aqueous polymer-pigment dispersion by suitable mixing. It is preferred to add alcohol to the aqueous polymer dispersion prior to pigment addition and grinding, as marked improvement in color development, smoothness, and gloss in the print are thereby effected. The prints have moderate water resistance upon heating and may be post-treated to produce films with excellent resistance to water, for example, with an aqueous alum solution or the like cation.

The aforedescribed polyester material is prepared according to the polyester preparation technology described in U.S. Pat. Nos. 3,734,874 and 3,779,993, the disclosures of which are incorporated herein by reference, and the use of the term "acid" in the above description and in the appended claims includes the various ester forming or condensable derivatives of the acid reactants such as the dimethyl esters thereof as employed in the preparations set out in these patents.

Dispersal of the present polyester material in water is preferably done at preheated water temperature of about a 180° to about 200° F. and the polymer added rapidly as pellets to the vortex under high shear stirring. A Cowles Dissolver, Waring Blender, or similar equipment may be used. Once water is heated to temperature, additional heat input is not required. Depending upon the volume prepared, dispersal of the pellets by stirring should be complete within 15 to 30 minutes. Continued agitation with cooling may be desirable to prevent thickening at the surface due to water evaporation. Viscosities of the dispersions remain low up to nonvolatile levels of about 25-30%, but generally increase sharply above these levels. Viscosities of the dispersions will be influenced by the degree of polymer dispersion (fineness) obtained which is affected by the dispersing temperature, shear, and time. A nonvolatile content for most applications is about 38% for the present preferred polyester material.

The present concentrates and inks may also be prepared by two-roll milling the finely comminuted, nonpolymer soluble pigment into the solid polyester material and thereafter dispersing the pigmented material in water in a manner generally similar to the procedure described in U.S. Pat. No. 4,148,779 for solubilizing organic disperse textile dyes in polyester for subsequent dispersal in water. Dispersions can also be made by adding the pigment at high speed agitation to the polyester material previously dispersed in water and then grinding in a ball mill or sand mill to further reduce pigment size. The preferred pH of the present inks is from about 5.0 to about 7.5.

The pigments useful in the present invention, in addition to those specifically identified above, include those described in NPIRI Raw Materials Data, Vol. 4, Pigments, Copyright 1983.

The following examples will further illustrate practice of the invention.

POLYESTER PREPARATION

Example 1

A mixture of 79.5 g (0.41 mole) of dimethyl isophthalate, 26.6 g (0.09 mole) of dimethyl-5-sodiosulfoisophthalate, 54.1 g (0.51 mole) of diethylene glycol, 37.4 g (0.26 mole) of 1,4-cyclohexanedimethanol, 1.4 ml of a 1.0% (based on Ti) catalyst solution of titanium tetraisopropoxide, and 0.74 g (0.009 mole) of sodium acetate buffer is stirred and heated for two hours at 200°-220° C. The temperature is then raised to 275° C. and a vacuum of 0.3 mm is applied. Heating and stirring is continued for 1 hour under these conditions. After cooling, the polymer obtained has an I.V. of 0.36 and is tough and rubbery and is dissipatable in hot water to the extent of about 25 weight percent to give a clear, slightly viscous solution. The composition of the acid moieties of this polyester material is analyzed to be 82 mole % isophthalic acid residue and 18 mole % 5-sodiosulfoisophthalic acid residue, and of the glycol moieties is analyzed to be 54 mole % diethylene glycol and 46 mole % 1,4-cyclohexanedimethanol.

Example 1A

Polyesters designated (a), (b), (c) and (d) were prepared essentially in accordance with Example 1 of the aforementioned U.S. Pat. No. 4,233,196 from the following materials:

| (a) | g. moles |
|---|---|
| Dimethyl Isophthalate (IPA) | 0.415 |
| Dimethyl-5-Sodiosulfoisophthalate (SIP) | 0.085 |
| 1,4-Cyclohexanedimethanol (CHDM) | 0.520 |
| Carbowax 1000 (CW 1000) | 0.0237 |
| Sodium Acetate | 0.0085 |
| Irganox 1010 | 0.0085 |

The Carbowax 1000 has the structure H—OCH$_2$—CH$_2$)$_n$OH wherein n is about 22. The polymer analyzed by NMR contains (in reacted form) about 83 mole % IPA, about 17 mole % SIP, about 94.5 mole % CHDM, and about 5.5 mole % of CW 1000, and has an I.V. of about 0.39.

| (b) | g. moles |
|---|---|
| Dimethyl Isophthalate | 0.328 |
| Dimethyl-5-Sodiosulfoisophthalate | 0.072 |
| 1,4-Cyclohexanedimethanol | 0.442 |
| Carbowax 400 (n = 10) | 0.058 |
| Sodium Acetate | 0.0072 |

The polymer as analyzed by NMR contains (in reacted form) about 82 mole % IPA, about 18 mole % SIP, about 85.5 mole % CHDM and about 14.5 mole % CW 400, and has an I.V. of about 0.46.

| (c) | g. moles |
|---|---|
| Dimethyl Isophthalate | 0.41 |
| Dimethyl-5-Sodiosulfoisophthalate | 0.09 |
| 1,4-Cyclohexanedimethanol | 0.55 |
| Carbowax 4000 (n = 90) | 0.0005 |
| Sodium Acetate | 0.009 |

The polymer as analyzed by NMR contains (in reacted from) about 82 mole % IPA, about 18 mole % SIP, about 99.9 mole % CHDM and about 0.1 mole % CW 4000, and has an I.V. of about 0.16.

| (d) | g. moles |
|---|---|
| Dimethyl Isophthalate | 0.205 |
| Dimethyl-5-Sodiosulfoisophthalate | 0.045 |
| Ethylene Glycol (EG) | 0.9638 |
| Carbowax 2000 (N = 45) | 0.03625 |
| Sodium Acetate | 0.0045 |

The polymer as analyzed by NMR contains (in reacted from) about 82 mole % IPA, about 18 mole % SIP, about 85.5 mole % EG and about 14.5 mole % CW 2000, and has an I.V. of about 0.34.

In such polymers containing the Carbowax material, the n value is preferably between about 6 and 150.

In accordance with the present invention, inks prepared from the above polyester material and including the alcohol and polymer insoluble pigments have been found to be unexpectedly superior over prior aqueous inks in one or more of such properties as flow-out or printability, pigment wetting, pigment stability, temperature stability (heat and freeze-thaw), non-settling for extended periods of time, nonpolluting with respect to odor and volatile organics, nonflocculating, wide viscosity range inks, adhesion to a variety of substrates, hardness, gloss, drying rate on substrates, resistance to grease, water and scuff, compatibility with other water-based inks, wet rub resistance, ink mileage characteristics (considerable water dilution allowable at the press), ink press stability in general, printability (clean, sharp transfer without "stringing or misting"), trapping, easy clean up, nonplugging or printing plates, flexibility, redispersibility or rewetting, crinkle resistance, high pigment loading, solvent resistance, alkali, chemical and detergent resistance, blocking resistance, lightfastness, toughness, substrate wetting, hold-out, opacity, dry-rate, and no offset on the printing press (coating, e.g. on tension rollers).

INK PREPARATION

Example 2

| Final Ink Composition | Approximate % by Weight |
|---|---|
| deionized water | 54.8 |
| polymer of Example 1 | 21.5 |
| carbon black, Pigment C.I. 7 | 13.5 |
| n-propanol | 10.0 |
| biocide, Tektamer 38 AD (1,2-dibromo-2,4-dicyanobutane) | 0.2 |

The solid polymer (32 parts) is dispersed in approximately 68 parts of deionized water at 85° C. to 95° C. and 0.2 parts of biocide added. To 75 parts of this dispersion is added 10 parts of deionized water and 15 parts of the carbon black at high speed agitation for five minutes on a Waring Blender. The mixture is then milled in an Eiger mill operated at about 5,000 rpm for about 7.5 minutes to further reduce the pigment for a grind of from about "2" to about "0" NPIRI grind gauge. The resulting composition has a pH of about 5.6 and a viscosity of 26–29 seconds on a #2 Zahn cup determined according to ASTM D-4212-82. To 90 parts by weight of this composition is added 10 parts by weight of n-propanol with stirring.

This procedure yields an aqueous-alcohol ink which is nonsettling for extended periods, does not flocculate or agglomerate, and can be reduced in viscosity with deionized water. The ink dries rapidly upon printing, has virtually no odor and can be readily cleaned from printing equipment with warm deionized water. Tenacious, dried films of this ink can be cleaned from printing equipment with small amounts of detergents (5–10%) added to warm (80°–90° F.) deionized water. Such properties are also obtained using other pigments such as those of the following examples.

Example 3

The solid polymer (32 parts) of Example 1 is dispersed in approximately 68 parts of deionized water at 85° C. to 95° C. and 0.2 parts of biocide (Tektamer 38 AD) added. To 70 parts of this dispersion is added 30 parts of the titanium dioxide pigment, C.I. 6, at high speed agitation for five minutes on a Waring Blender. The mixture is then milled in an Eiger mill operated at about 5,000 rpm for about 7.5 minutes to further reduce the pigment for a grind of from about "2" to about "0" NPIRI grind gauge. The resulting composition has a pH of about 6.6 and a viscosity of 26–29 seconds on a #2 Zahn cup determined according to ASTM D-4212-82. To 90 parts by weight of this composition is added 10 parts by weight of n-propanol. This ink was reduced to a press-ready viscosity of 22 seconds (#2 Zahn cup) with deionized water. Proofs of this ink were prepared with a flexographic hand proofer employing a 180 line anilox roll on aluminum foil, Mylar film, corona discharge treated polyethylene coated paperboard and corona discharge treated polyethylene film with excellent adhesion and printability results.

Example 4

The solid polymer (32 parts) of Example 1 is dispersed in approximately 68 parts of deionized water at 85° C. to 95° C. and 0.2 parts of biocide (Tektamer 38 AD) added. To 89 parts of this dispersion is added 11 parts of the blue pigment, C.I. 15:3 at high speed agitation for five minutes on a Waring Blender. The mixture is then milled in an Eiger mill operated at about 5,000 rpm for about 7.5 minutes to further reduce the pigment for a grind of from about "2" to about "0" NPIRI grind gauge. The resulting composition has a pH of about 5.85 and a viscosity of 28–32 seconds on a #2 Zahn cup determined according to ASTM D-4212-82. To 90 parts of this composition is added 10 parts of n-propanol. This ink was printed on corona discharge treated polyethylene film as in Example 3 with excellent adhesion and printability results.

Example 5

The solid polymer (32 parts) of Example 1 is dispersed in approximately 68 parts of deionized water at 85° C. to 95° C. and 0.2 parts of biocide (Tektamer 38 AD) added to provide a resin dispersion. To 60 parts of this resin dispersion is added 10 parts of n-propyl alcohol with agitation in a Waring Blender to obtain a substantially homogeneous mixture. 30 Parts of C.I. Pigment Blue 15:3, is added to the mixture with high speed agitation and blended for approximately five minutes. The blend is then milled in an Eiger mill operated at about 5,000 rpm for about three minutes to further wet-out and reduce the pigment for a grind rating of less than about 1.0 on the NPIRI (National Printing Ink Research Institute) grind scale. The resulting concentrate has a viscosity of about 1536 cps on a Model LVF Brookfield Syncro-Lectric Viscometer. To 33.3 parts by weight of this concentrate is added 63.0 parts of a resin dispersion prepared as in this example above, and 3.7 parts of n-propyl alcohol to formulate an ink which has a viscosity of approximately 28 seconds on a #2 Zahn cup, determined according to ASTM D-4212-82. This ink can be reduced readily to a lower viscosity if desired with deionized water. Proofs of this ink were prepared with a flexographic handproofer employing a 180-line anilox roll and with a Geiger Gravure proof press using a 150-line engraved cylinder. This ink has good printability, gloss, color development, and adhesion when printed on aluminum foil, Mylar film and clay-coated paper.

The invention has been described in detail with particular reference to preferred embodiments thereof, but it will be understood that variations and modifications can be effected within the spirit and scope of the invention.

We claim:

1. A composition useful as or for the manufacture of printing inks comprising:
   (A) from about 5 to about 60 weight % of polymeric material of at least one linear, water-dissipatable polymer having carbonyloxy linking groups in the linear molecular structure, the polymer having an inherent viscosity of from about 0.1 to about 1.0 measured in a 60/40 parts by weight solution of phenol/tetrachloroethane at 25° C. and at a concentration of 0.25 gram of polymer in 100 ml of the solvent, the polymer containing substantially equimolar proportions of acid equivalents (100 mole percent) to hydroxy equivalents (100 mole percent), the polymer comprising the reaction products of (a), (b), (c) and (d) from the following reactants or ester forming derivatives thereof;
   (a) at least one difunctional dicarboxylic acid;
   (b) from about 4 to about 25 mole percent of at least one difunctional sulfomonomer containing at least one cationic sulfonate group attached to an aromatic or cycloaliphatic nucleus wherein the functional groups are;
   (c) about 45 to about 60 mole % diethylene glycol; and
   (d) about 55 to about 40 mole % 1,4-cyclohexanedimethanol, ethylene glycol or mixtures thereof;
   (B) from about 0.1 to about 60 weight % of pigment material dispersed in said polymeric material; and
   (C) from about 10 to about 90 weight % of water admixed with alcohol selected from methanol, ethanol, n-propanol, isopropanol or mixtures thereof, in a weight ratio of water to alcohol of from about 99/1 to about 1/1.

2. A composition of claim 1 wherein:
   (A) the polymeric material comprises one or more polyester materials having an inherent viscosity of from about 0.28 to about 0.38, and an acid moiety of from about 75 to about 84 mole % isophthalic acid and conversely from about 25 to about 16 mole % 5-sodiosulfoisophthalic acid;
   (B) the pigment material is present in a weight ratio with respect to total polyester materials of from about ⅛ to about 4/1 blended with said polyester material; and
   (C) the water/alcohol mixture comprises from about 30 to about 70 weight % of the composition.

3. A composition of claim 2 wherein said acid moiety comprises from about 80 to about 83 mole % isophthalic acid and conversely from about 20 to about 17 mole % 5-sodiosulfoisophthalic acid, and said glycol moiety comprises from about 52 to about 56 mole % diethylene glycol and conversely from about 48 to about 44 mole % 1,4-cyclohexanedimethanol.

4. A composition of claim 3 wherein the weight ratio of water to alcohol is from about 85/10 to about 95/10.

5. A composition of any one of claims 1–4 wherein the pigment is one or a mixture of the following color index materials: C.I. Pigment Yellow 17; C.I. Pigment Blue 27; C.I. Pigment Red 49:2; C.I. Pigment Red 81:1; C.I. Pigment Red 81:3; C.I. Pigment Red 81:x; C.I. Pigment Yellow 83; C.I. Pigment Red 57:1; C.I. Pigment Red 49:1; C.I. Pigment Violet 23; C.I. Pigment Green 7; C.I. Pigment Blue 61; C.I. Pigment Red 48:1; C.I. Pigment Red 52:1; C.I. Pigment Violet 1; C.I. Pigment White 6; C.I. Pigment Blue 15; C.I. Pigment Yellow 12; C.I. Pigment Blue 56; C.I. Pigment Orange 5;

C.I. Pigment Black 7; C.I. Pigment Yellow 14; C.I. Pigment Red 48:2; and C.I. Pigment Blue 15:3.

6. An aqueous-alcohol ink of the composition of any one of claims 1–4 wherein the polymeric material comprises from about 10 to about 40% by weight thereof.

7. An aqueous-alcohol ink of the composition of claim 6 coated onto a substrate selected from metal foil, newsprint, bleached and unbleached Kraft paper, clay coated paper, glass, calendered paper, stainless paper, paper board, and films or other substrates of polyester, polycarbonate, cellulose ester, regenerated cellulose, poly(vinylidiene chloride), polyamide, polyolefin, or polystyrene.

8. A substantially water-insoluble coating or print on a substrate, said coating or print comprising a composition of claim 6 wherein said water and alcohol have evaporated and a substantial portion of the initial metal cations of the water solubilizing sulfonate groups of the polymeric material has been replaced with an insolubilizing cation.

9. The method for preparing the concentrate of the composition of claim 1 comprising the steps of:

(a) dispersing said polymeric material in deionized water;
(b) adding said alcohol to the dispersion of (a) with agitation to obtain a substantially homogeneous mixture;
(c) adding said pigment to the mixture of (b) with agitation to form a pre-dispersion blend; and
(d) grinding the blend of (c) to reduce the pigment particle size to less than about 6.0 on the NPIRI scale.

10. The method for preparing an ink from the composition of any one of claims 1–4 comprising adding to the composition either or both of (a) a dispersion of polymeric material in deionized water, and
(b) a water-alcohol mixture, to reduce the viscosity of said composition to between about 15 and 35 seconds on a #2 Zahn cup, the amounts of said dispersion (a) and/or water-alcohol mixture (b) added being such as to give good printability and flow-out on the particular substrate to be printed.

* * * * *

UNITED STATES PATENT AND TRADEMARK OFFICE
CERTIFICATE OF CORRECTION

PATENT NO. : 5,041,489

DATED : August 20, 1991

INVENTOR(S) : Charles H. Coney et al.

It is certified that error appears in the above-identified patent and that said Letters Patent is hereby corrected as shown below:

Column 10, line 23, between "are" and ";", insert ---carboxyl---.

Signed and Sealed this

Ninth Day of February, 1993

Attest:

STEPHEN G. KUNIN

*Attesting Officer*      Acting Commissioner of Patents and Trademarks